(12) United States Patent
Burstein et al.

(10) Patent No.: US 8,185,378 B2
(45) Date of Patent: May 22, 2012

(54) METHOD AND SYSTEM FOR DETERMINING TEXT COHERENCE

(75) Inventors: Jill Burstein, Princeton, NJ (US); Derrick Higgins, Highland Park, NJ (US); Claudia Gentile, Ewing, NJ (US); Daniel Marcu, Hermosa Beach, CA (US)

(73) Assignee: Educational Testing Service, Princeton, NJ (US)

( * ) Notice: Subject to any disclaimer, the term of this patent is extended or adjusted under 35 U.S.C. 154(b) by 0 days.

(21) Appl. No.: 12/776,827

(22) Filed: May 10, 2010

(65) Prior Publication Data

US 2010/0223051 A1    Sep. 2, 2010

Related U.S. Application Data

(63) Continuation of application No. 10/974,133, filed on Oct. 26, 2004, now Pat. No. 7,720,675.

(60) Provisional application No. 60/514,837, filed on Oct. 27, 2003.

(51) Int. Cl.
    *G06F 17/27*    (2006.01)
(52) U.S. Cl. ............................ 704/9; 704/1; 704/10
(58) Field of Classification Search ............... 704/1, 9, 704/10
    See application file for complete search history.

(56) References Cited

U.S. PATENT DOCUMENTS

| | | | |
|---|---|---|---|
| 5,604,839 A | 2/1997 | Acero et al. | |
| 6,115,683 A | 9/2000 | Burstein et al. | |
| 6,181,909 B1 | 1/2001 | Burstein et al. | |
| 6,254,395 B1 | 7/2001 | Breland et al. | |
| 6,356,864 B1 | 3/2002 | Foltz et al. | |
| 6,366,759 B1 | 4/2002 | Burstein et al. | |
| 6,523,026 B1 | 2/2003 | Gillis | |
| 6,751,621 B1 | 6/2004 | Calistri-Yeh et al. | |
| 6,757,646 B2 | 6/2004 | Marchisio | |
| 6,796,800 B2 | 9/2004 | Burstein et al. | |
| 7,043,194 B2 | 5/2006 | Hoyashita et al. | |
| 2002/0142277 A1 | 10/2002 | Burstein et al. | |
| 2003/0031996 A1 | 2/2003 | Robinson | |
| 2003/0160944 A1 | 8/2003 | Foote et al. | |
| 2004/0175687 A1 | 9/2004 | Burstein et al. | |

OTHER PUBLICATIONS

Kanerva et al.; Random Indexing of Text Samples for Latent Semantic Analysis; Proc. of the 22nd Annual Conference of the Cognitive; 2000.
Larkey; Automatic Essay Grading Using Text Categorization Techniques; Proc. of the 21st Annual International ACM SIGIR; pp. 90-95; 1998.
Burstein et al.; Finding the WRITE Stuff: Automatic Identification of Disclosure Structure in Student Essays; IEEE; pp. 32-39; 2003.
Williams; Automated Essay Grading: An Evaluation of Four Conceptual Models; TL Forum; pp. 1-8; 2001.

(Continued)

*Primary Examiner* — David R Hudspeth
*Assistant Examiner* — Lamont Spooner
(74) *Attorney, Agent, or Firm* — Jones Day (57) ABSTRACT

A method and system for determining text coherence in an essay is disclosed. A method of evaluating the coherence of an essay includes receiving an essay having one or more discourse elements and text segments. The one or more discourse elements are annotated either manually or automatically. A text segment vector is generated for each text segment in a discourse element using sparse random indexing vectors. The method or system then identifies one or more essay dimensions and measures the semantic similarity of each text segment based on the essay dimensions. Finally, a coherence level is assigned to the essay based on the measured semantic similarities.

20 Claims, 3 Drawing Sheets

OTHER PUBLICATIONS

Valenti et al.; An Overview of Current Reseach on Automated Essay Grading; Journal of Information Technology Education, vol. 2; pp. 319-330; 2003.

Burstein; Automated Evaluation of Essays and Short Answers; Fifth Int'l Computer Assisted Assessment Conference; pp. 1-12; 2001.

Johnson; On Bayesian Analysis of Multi-Rater Ordinal Data: An Application to Automated Essay Grading; Journal of the American Statistical Assoc.; pp. 1-20; 1996.

Sahlgren; Vector-Based Semantic Analysis: Representing Word Meanings Based on Random Labels; ESSLLI 2001 Workshop on Semantic Knowledge Acquisition; pp. 1-21; 2002.

Dumais; Inductive Learning Algorithms and Representations for Text Categorization; Proc. of the 7th Int'l Conf. on Information & Knowledge Management; ACM; pp. 148-155; 1998.

Burstein et al.; Towards Automatic Classification of Discourse Elements in Essays; Proc. of 39th Ann. Meeting on Assoc. For Computational Linguistics; ACM; p. 98-105; 2001.

Foltz et al.; The Measurement of Textual Coherence with Latent Semantic Analysis; Discourse Processess; 25: 285-307; 1998.

Wiemer-Hastings, et al.; Select-A-Kibitzer: A Computer Tool That Gives Meaningful Feedback on Student Compositions; Interactive Learning Environments; vol. 8, No. 2; pp. 149-169; 2000.

Dumais; Enhancing Performance in Latent Semantic Indexing (LSI) Retrieval; Bellcore, 21236; Sep. 1992.

Salton; Introduction to Modern Information Retrieval; McGraw-Hill; 1983.

Cristianini et al.; An Introduction to Support Vector Machines and Other Kernel-based Learning Methods; Cambridge University Press; 2001.

Chang, et al.; LIBSVM—A Library for Support Vector Machines; InternetArchive.org, cached Apr. 24, 2001.

METHOD AND SYSTEM FOR DETERMINING TEXT COHERENCE

CLAIM OF PRIORITY

This application is a continuation of the U.S. patent application Ser. No. 10/974,133, entitled "Method and System for Determining Text Coherence," filed on Oct. 26, 2004 now U.S. Pat. No. 7,720,675. The present application and the '133 application claim priority to and the benefit of the U.S. Provisional Application Ser. No. 60/514,837, filed Oct. 27, 2003, entitled "Establishing Text Coherence Using Discourse Segments and Sentence Similarity Measures." All of these are hereby incorporated into the present application by reference.

TECHNICAL FIELD

The present invention generally relates to a method for performing automated text coherence assessment. Specifically, the present invention relates to evaluating text coherence using discourse elements and sentence similarity measures for the purpose of evaluating, for example, an essay.

BACKGROUND

Practical writing experience is generally regarded as an effective method of developing writing skills. In this regard, literature pertaining to the teaching of writing suggests that evaluation and feedback, specifically pointing out strong and weak areas in a student's essay writing, may facilitate improvements in the student's writing abilities. This is particularly so with regard to essay coherence.

In traditional writing classes, an instructor evaluates student essays. This evaluation typically includes comments directed to specific elements of the essay. Similarly, with the advent of automated essay evaluation, a computer application can be configured to evaluate an essay and provide feedback. For particular writing errors, such as misspellings or subject-verb agreement, this process is straightforward. Word spellings, for instance, can be compared against a list of correctly spelled words. Any words not found in the list are determined to be incorrectly spelled. Errors in subject-verb agreement can be identified based on a corpus of annotated essays.

In contrast, providing feedback regarding a student's writing style is typically more subjective in nature. Essay coherence, where the correlation between segments of text is evaluated, is one area where subjective feedback is present. Cohesion relates to both the correlation of the text to various smaller segments within the text and relatedness of the text to a test prompt.

Essay coherence is related to semantic similarity between various segments of text. For example, words within sentences of a discussion section of an essay should be similar to the words used in a topic sentence for the discussion section in order for the essay to be coherent.

Determining whether two sentences in a text are related depends on many factors, such as whether the two sentences refer to the same entities, whether they relate to the same topic, and whether anaphoric connections exist between them. Given the current state of natural language understanding, a determination of whether two text segments are related requires a representation of the similarity of their semantic content. A semantic similarity metric based on the relatedness of sentences within an essay can be devised because related sentences in a text typically tend to use the same or similar words. Thus, the use of similar words functions as a predictor of relatedness.

One known method of evaluating an essay for coherence includes the use of a vector-based similarity calculation between text segments to measure relatedness. In such a method, vectors represent text segments after modeling. The cosine between each pair of adjacent sentences is then calculated. A very high cosine value would indicate excessive redundancy between the sentences. A low cosine value indicates a conceptual shift in the text. A conceptual shift can occur if the text is not well connected or if the essay writer switches to a new topic. A cohesive essay should have neither high nor low cosine values. The method can respond to these scenarios and provide the appropriate feedback to the student. By taking the average cosine between adjacent sentences, in a linear manner, a measure of the overall coherence of the text is evaluated.

Latent Semantic Analysis (LSA) is a method of representing text segments as vectors. LSA is a statistical model of word usage that compares the semantic similarity between text segments. In order to analyze an essay, LSA first generates a matrix of occurrences of each word in each document (sentences or paragraphs). LSA then uses singular-value decomposition (SVD), a technique closely related to eigenvector decomposition and factor analysis. The SVD scaling decomposes the word-by-document matrix into a set of k, typically 100 to 300, orthogonal factors from which the original matrix can be approximated by linear combination. Instead of representing documents and terms directly as vectors of independent words, LSA represents them as continuous values on each of the k orthogonal indexing dimensions derived from the SVD analysis. Since the number of factors or dimensions is much smaller than the number of unique terms, words will not be independent. For example, if two terms are used in similar contexts (documents), the terms will have similar vectors in the reduced-dimensional LSA representation.

One can interpret the analysis performed by SVD geometrically. The result of the SVD is a k-dimensional vector space containing a vector for each term and each document. The location of term vectors reflects the correlations in their usage across documents. Similarly, the location of document vectors reflects correlations in the terms used in the documents. In this space, the cosine or dot product between vectors corresponds to their estimated semantic similarity. Thus, by determining the vectors of two pieces of textual information, the semantic similarity between them can be determined.

In LSA, the rows (and the columns) of the frequency matrix can be interpreted as multi-dimensional context vectors where the elements are normalized frequency counts and the dimensionality is the number of contexts in the text data. Thus, the representations are local. The inherent problem with using local representations in natural language processing is that the size, or dimensionality, of the representations grows with the size of the data. This means that the model does not scale and that the co-occurrence matrix can become computationally intractable as the vocabulary and the document collection grow. In contrast, reducing the dimensionality of the matrix can make the method computationally feasible.

In LSA, a vector for a new document is obtained by making a sparse vector of the length of the vocabulary, indicating the frequency of each term in the document, and multiplying this vector by the term matrix T, in order to map the vector to the reduced space. The vector representation for a text segment (for example, a sentence) equals the vector sum of the term vectors for each word in the segment. The term vectors could have previously been normalized to unit length, and a stoplist can be used to prevent the vectors for function words from being included in the sum.

Several drawbacks exist for the known systems of text coherence evaluation which simply calculate the similarity between adjacent sentences in a text, assuming that the chain of text coherence is essentially linear.

Accordingly, it is necessary to develop a method of evaluating the coherence of an essay including various discourse elements and a plurality of text segments, wherein the essay is annotated, the text segments are represented by vectors, and the text segment vectors are compared in a more coherent manner than a simple linear comparison.

Additionally, it is necessary to develop a method of representing text segments as vectors that overcomes the limitations of previous technologies, such as LSA and calculating cosines between adjacent sentences.

Finally, it is necessary to develop a system that generates quantitative and/or qualitative feedback on discourse elements and essays.

The present invention is directed towards solving one or more of these problems.

SUMMARY

Before the present methods are described, it is to be understood that this invention is not limited to the particular methodologies or protocols described, as these may vary. It is also to be understood that the terminology used herein is for the purpose of describing particular embodiments only, and is not intended to limit the scope of the present invention which will be limited only by the appended claims.

It must be noted that as used herein and in the appended claims, the singular forms "a", "an", and "the" include plural reference unless the context clearly dictates otherwise. Thus, for example, reference to an "algorithm" is a reference to one or more algorithms and equivalents thereof known to those skilled in the art, and so forth. Unless defined otherwise, all technical and scientific terms used herein have the same meanings as commonly understood by one of ordinary skill in the art. Although any methods and materials similar or equivalent to those described herein can be used in the practice or testing of the present invention, the preferred methods, devices, and materials are now described. All publications mentioned herein are incorporated herein by reference. Nothing herein is to be construed as an admission that the invention is not entitled to antedate such disclosure by virtue of prior invention.

In an embodiment, a method that captures the expressive quality of sentences in the discourse elements of an essay is described. For example, two global coherence aspects and, for example, two local coherence aspects may define the expressive quality of an essay. The global coherence aspects may include (a) the correlation of a sentence to an essay question (topic) and (b) the correlation between discourse elements. The local coherence aspects may include (c) the interrelation of sentences within a discourse element and (d) intra-sentence quality.

The present invention is directed towards predicting whether a sentence in a discourse element has high or low expressive quality with regard to a particular coherence dimension. In an embodiment, essay coherence includes multiple dimensions. Accordingly, an instructional application may provide appropriate feedback to a writer, based on the application's evaluation of each dimension. For instance, sentences in a thesis statement may have a strong relationship to the essay topic, but may have a number of serious grammatical errors that makes it hard to follow. For such a thesis statement, a system may provide feedback that the thesis statement addresses the topic, but that the statement, as a discourse element, would be clearer without grammatical errors. In contrast, if sentences that comprise a thesis statement are grammatically correct but are only loosely related to the essay prompt, a system may note that the student should revise the thesis statement appropriately.

In an embodiment, a system considers sentences with regard to their discourse elements and how the sentences relate to text segments both inside (such as the essay thesis) and outside (such as the essay prompt) of a document. As such, coherence breakdowns due to global aspects of essay-based discourse structure may be identified.

In an embodiment, a method includes determining the coherence of an essay and identifying locations where coherence breaks down in order to provide feedback to the essay writer. The methods and systems for essay coherence may include multiple dimensions. An essay's text may be annotated to denote discourse elements, and segment interrelation may be measured.

In an embodiment, a method of evaluating the coherence of an essay includes receiving an essay including one or more discourse elements and a plurality of text segments, annotating the one or more discourse elements of the essay, generating a text segment vector for each text segment corresponding to a discourse element using a vector-based method of random indexing, identifying one or more essay dimensions, measuring semantic similarity with respect to at least one text segment based on the essay dimensions, and assigning a coherence level to the essay based on the measured semantic similarity with respect to the at least one text segment. The essay dimensions may include one or more of relatedness of a text segment to a prompt where the essay is written in response to the prompt, relatedness between a first text segment corresponding to a first discourse element and a second text segment corresponding to a second discourse element, and relatedness between text segments within a discourse element. The essay dimensions may include the number of errors in one or more of grammar, usage and mechanics for a text segment. A text segment may be assigned a rank based on the number of errors.

In an embodiment, determining semantic similarity may include calculating, using a support vector machine, semantic similarity based on data related to at least one essay dimension. The data provided to the support vector machine may include one or more of a maximum prompt similarity score for a text segment with a sentence in a prompt, a task sentence similarity score for the text segment with a required task sentence, a maximum thesis similarity score for the text segment with a sentence in a thesis, a maximum similarity score for the text segment with a sentence in a preceding discourse element, a predetermined text similarity score for the text segment with each of one or more predetermined text segments, a number of sentences in a discourse element corresponding to the text segment, a number of sentences in a discourse element corresponding to the text segment having a prompt similarity score greater than a first specified threshold, a number of sentences in a discourse element corresponding to the text segment having a task sentence similarity score greater than a second specified threshold, a number of sentences in a discourse element corresponding to the text segment having a thesis similarity score greater than a third specified threshold, a length, in words, of the text segment, a Boolean flag indicating whether the text segment contains an anaphoric element, a discourse element corresponding to the text segment, a thesis sentence, and a sentence numbering position. The required task sentence may be a portion of the prompt including an explicit directive to write about a specific topic. The sentence numbering position may correspond to a number of sentences that the text segment is from the beginning of the discourse element corresponding to the text segment. The maximum prompt similarity score may be computed by computing a prompt similarity score for each sentence of the prompt and the text segment and selecting a prompt similarity score that is greater than all other prompt similarity scores. The maximum thesis similarity score may be computed by computing a thesis similarity score for each sentence of the thesis and the text segment and selecting a thesis similarity score that is greater than all other thesis similarity scores. The maximum similarity score may be computed by computing a similarity score for each sentence of the preceding discourse element and the text segment and selecting a similarity score that is greater than all other similarity scores.

In an embodiment, the essay dimensions may include at least one essay dimension ranked by rule-based heuristics. The discourse elements may include one or more of background material, a supporting idea, a conclusion, a thesis and a main idea. A text segment may be assigned a rank based on its relatedness to, for example, the thesis and/or the main idea.

In an embodiment, a human evaluator and/or an automatic evaluator may annotate each discourse element.

In an embodiment, a method of evaluating the coherence of each of a plurality of essays includes receiving a plurality of essays each including one or more discourse elements and a plurality of text segments, annotating the one or more discourse elements for each essay, generating a text segment vector for each text segment using a vector-based method of random indexing, identifying one or more essay dimensions, measuring semantic similarity with respect to at least one text segment for each essay based on the essay dimensions, and assigning a coherence level to each essay based on the measured semantic similarity with respect to the at least one text segment. The method may further include generating a comparison model based on one or more essays having annotated discourse elements, and using the comparison model with an automated essay evaluation system. Each text segment may be a word.

In an embodiment, a method of determining the relatedness of two text segments within an essay includes assigning a label vector and a semantic vector to each word in a corpus; for each word appearing within the corpus, adding a vector to the semantic vector corresponding to the word, normalizing each semantic vector to a unit length; receiving an essay including a plurality of text segments, determining, for each text segment, one or more words associated with the text segment, summing the semantic vectors for words associated with a text segment to determine a text segment vector for the text segment, and calculating a semantic similarity between at least one pair of text segment vectors to determine the relatedness of at least one pair of text segments corresponding to the text segment vectors. The vector may be computed by multiplying each entry of the label vector corresponding to one or more second words proximate to the word by a weighted value. The weighted value may be based on the proximity of the word to the second word. The label vector and the semantic vector may each have about 1800 entries, and may each have less than about ten entries that are non-zero. Calculating a semantic similarity may include computing a cosine of an angle between a pair of text segment vectors.

In an embodiment, a method of determining the relatedness of two text segments within a text includes determining one or more words in each text segment, representing the one or more words of each text segment as term vectors, normalizing the term vectors, summing the normalized term vectors for all text segments, dividing the sum of the normalized term vectors by the number of term vectors to obtain a mean vector, subtracting the mean vector from each of the term vectors to arrive at a recalculated term vector, calculating the average of the recalculated term vectors to obtain a text segment vector, and calculating a semantic similarity between at least one pair of text segment vectors to determine the relatedness of at least one pair of text segments corresponding to the text segment vectors. Calculating a semantic similarity may include computing a cosine of an angle between a pair of text segment vectors.

BRIEF DESCRIPTION OF THE DRAWINGS

The present invention will be better understood, and its numerous objects and advantages will become more apparent, by reference to the following detailed description of the invention when taken in conjunction with the following drawings, of which.

DETAILED DESCRIPTION

In an embodiment, a system of evaluating the discourse elements of an essay includes an annotator. The annotator may denote the presence and/or absence of relevant essay-based discourse elements in an essay. The annotator may use a voting algorithm based on decisions from, for example, three independent discourse analysis systems. The annotator may automatically label discourse elements in student essays written on any topic and/or writing genre. The use of the voting algorithm may permit identification of cases in which a breakdown in coherence occurs due to global aspects of essay structure.

In an embodiment, the annotation of essays identifies relevant discourse elements. The discourse elements may relate to different text segments of an essay. In an embodiment, the discourse elements include background material, a thesis, main ideas, supporting ideas and a conclusion. Once discourse elements are labeled, the text corresponding to each element may be evaluated for relevancy and cohesion. Labeling discourse elements may be performed either manually by human evaluators or automatically, such as by a computerized annotator.

In an embodiment, a method for annotating the expressive quality of essay-based discourse elements may seek to achieve one or more of the following objectives:

1. To yield annotations that are useful for the purpose of providing feedback to essay writers regarding the expressive relatedness of discourse elements in their essays, given four relatedness dimensions.
2. To permit human annotators to achieve high levels of consistency during the annotation process.
3. To produce annotations derivable by computer programs through training on corpora annotated by humans.

The expressive relatedness of a sentence discourse element in such a method may be characterized in a number of relatedness dimensions. For example, the relatedness dimensions may include: 1) its relationship to an essay prompt; 2) its relationship to other discourse elements; 3) errors in grammar, usage, and mechanics; and/or 4) the relationship of sentences within the discourse element with each other.

Two or more annotators may label each sentence of an essay for expressive quality on each dimension. Each sentence may be either manually annotated by human evaluators or automatically annotated by systems known in the art with one or more discourse labels, such as background material, thesis, main ideas, supporting ideas and conclusion. Each sentence may be assigned a rank of, for example, high (1) or low (0) on each dimension relevant to the assigned discourse element. In an embodiment, each dimension may apply to one or more discourse elements.

The relationship between the text of the discourse element and the prompt topic (essay question) may be calculated as Dimension 1. Specifically, sentences labeled as a thesis statement, main idea or conclusion may be expected to contain text that is strongly related to the essay topic. If this relationship does not exist, it may be inferred that the essay is off-topic. For this dimension, a high rank may be assigned to each sentence from the background material, the thesis, main ideas and/or the conclusion that is related to the prompt text. Otherwise, a low rank may be assigned.

The relationship between a discourse element and other discourse elements in the text may govern the global coherence of the essay text and may be calculated as Dimension 2. A coherent essay may include certain related discourse elements. In contrast, a non-cohesive essay may be difficult to follow. Specifically, a high rank may be assigned to each sentence in the background material, main ideas and conclusion that is related to the thesis. Furthermore, a high rank may be assigned to each sentence in the supporting ideas that relate to a main idea. A conclusion sentence may also be given a high rank if it is related to a main idea and/or background material. A low rank may be assigned to a sentence that does not have one of these relationships.

Dimension 3 represents the clarity of expression, or coherence, within an individual sentence. This dimension is based solely on technical correctness. Dimension 3 may include a count of grammar, usage and mechanics errors in a sentence and assign a high or low rank to essay sentences using a set of rule-based heuristics. For example, a sentence may be assigned a low rank for Dimension 3 if it contains frequent patterns of error, such as the following: (a) the sentence contains two or more errors in grammar, word usage or mechanics (i.e., spelling, capitalization or punctuation); (b) the sentence is an incomplete sentence; and/or (c) the sentence is a run-on sentence (i.e., 4 or more independent clauses within a sentence). Otherwise, a sentence may be assigned a high mark.

A fourth dimension may calculate the cohesiveness of sentences within discourse elements in a text. This dimension may identify a text segment that is non-cohesive within a discourse element. For this dimension, a high rank may be assigned to each sentence in a discourse element that relates to at least one other sentence in the element. Otherwise, the sentence may receive a low rank. If a discourse element contains only one sentence, the rank assigned to Dimension 2 may also be assigned to Dimension 4.

Dimensions 1, 2 and 4, as described above, may establish whether a sentence is related to some other part of the essay. Devising a semantic similarity metric that establishes the relatedness of sentences within an essay may be based on the pre-condition that related sentences in a text tend to use the same or similar words. A vector representation of the similarity of two text segments may be used to determine whether the text segments are related. In contrast, the calculation of Dimension 3 does not require a vector representation.

Once a set of essays is annotated for each discourse element, the essays may be evaluated (either by human evaluators or automatically) for each dimension. In order to generate models for which automatic evaluation is achievable, human annotators may be required to generate training data for the automatic system.

The present evaluation system of essay coherence may further include the use of random indexing. The Random Indexing technique is a solution to the shortcomings of LSA technologies (described above) and overcomes the limitations of dimension reduction for a co-occurrence matrix.

Dimension reduction techniques are typically computationally prohibitive. Thus, if efficiency is important, it may be infeasible to use such techniques. Furthermore, dimension reduction is a one-time operation, with a rigid result. In other words, new data may not be added to the model once a dimension reduction has been performed without performing the dimension reduction technique again. An alternative to vector-space models that use local co-occurrence matrices and some form of dimension reduction is the use of distributed representations that eliminate the need for separate dimension reduction of the co-occurrence matrix.

A Random Indexing technique may accumulate a words-by-contexts co-occurrence matrix by incrementally adding together distributed representations in the form of high-dimensional (i.e., on the order of thousands) sparse random index vectors. A sparse random index vector may contain a small number of non-zero entries, which are either +1 or −1, preferably in equal numbers. For example, if an index vector has eight non-zero entries, it may have four +1 entries and four −1 entries.

The index vectors may function as indices or labels for words and/or documents, depending on the desired type of co-occurrences. For document-based co-occurrences, high-dimensional sparse random index vectors may be assigned to each document. A words-by-contexts matrix may then be generated by adding a document's index vector to the row in the matrix for a given word every time the word occurs in the document. The technique may be similar to the technique used for computing word-based co-occurrences. First, a high-dimensional sparse random index vector may be assigned to each word that appears in a document. Then, every time a given word occurs in the document, the index vectors of the surrounding words may be added to the row corresponding to the focus word. The co-occurrence matrix may represent words by high-dimensional context vectors that contain traces of every context (word or document) that the word has co-occurred with (or in).

The same procedure may alternately produce a local frequency matrix if unary vectors of the same dimensionality as the number of documents (when using document-based co-occurrences) or the size of the vocabulary (when using word-based co-occurrences) are used. These index vectors would have a single "1" marking the place of the context (word or document) in a list of all contexts (i.e., the $n^{th}$ bit of the index vector for the $n^{th}$ document or word would be "1"). Mathematically, the unary local vectors are orthogonal, whereas the random index vectors described above are only nearly orthogonal. However, since a greater number of nearly orthogonal directions than truly orthogonal directions exist in a high-dimensional space, choosing random directions may yield a sufficiently close result to orthogonality to provide an approximation of the unary vectors.

The amount of noise introduced by choosing random directions may have only a negligible effect on the similarity relations between the entries. In other words, the local frequency matrix and the Random Indexing matrix may contain approximately the same information. As a result, by using, for example, 1,800-dimensional random index vectors with eight non-zero elements, approximately the same co-occurrence information may be accumulated in a 50,000 word by 1,800 context matrix as in a 50,000 by 50,000 matrix or 50,000 by 30,000 matrix using local frequency representations for word-based vs. document-based co-occurrences.

By using the random index vectors to accumulate the co-occurrence matrix, a dimension reduction of the data is effectively performed without the need for an explicit dimension reduction phase. Accordingly, Random Indexing is more efficient than techniques using computationally intensive dimension reduction techniques. In addition, Random Indexing may incorporate new data immediately without the need to recompute the entire matrix. For example, a new word requires only a new row in the co-occurrence matrix, and existing context vectors may simply be updated with the new information. Furthermore, the high-dimensional sparse random index vectors may cover any vocabulary size without increasing the dimensionality of the vectors. As such, the technique is extremely scalable.

Random Indexing does not require a specialized corpus (such as one that is topically coherent and neatly divided into documents for training). The algorithm underlying Random Indexing also differs from the application of singular-value decomposition to a term-by document matrix, which is the basis of Latent Semantic Analysis.

Random Indexing may assign vector representations to words as follows:

1. Every word in the vocabulary is assigned a label vector. In an embodiment, label vectors are 1800 entries in length. Almost all of the entries may be set to zero. In an embodiment, eight elements of each label vector are non-zero. These elements may be randomly set to either 1 or −1.
2. A semantic vector is then initialized for each word. In an embodiment, the semantic vectors are 1800 entries in length. All of the entries may be set to zero.
3. The semantic vectors are trained using a text corpus. In an embodiment, for each word token in the corpus, that word's semantic vector (or "term vector") is incremented by the label vectors of each word appearing within a certain distance of it. Alternatively, for each word token in the corpus, the word's semantic vector may be incremented by the label vectors for all words in the same sentence, paragraph or other text segment. In an embodiment, a weighted sum is computed such that words closer to the target word have a greater impact in determining the target word's semantic vector. In an embodiment, the system may use a text window of 2-3 words.

In an embodiment, an improved Random Indexing method is used to represent text segments as vectors. A set of random normalized term vectors may be used to produce a document vector. The term vectors may be added together and divided by the number of vectors in the set, n, to form the document vector. As n increases, the document vector approaches the mean vector $\vec{x}_{mean}$, which is the average of all term vectors.

$$\lim_{n \to \infty} \frac{1}{n} \sum_{i=1}^{n} \vec{x}_i = \vec{x}_{mean}$$

Comparing the similarity (cosine) between two such random documents, as each document grows longer, the similarity should approach 1, since $$\cos(\vec{x}_{mean_1} - \vec{x}_{mean_2}) = 1$$

In other words, the similarity between documents increases with their length, regardless of their relatedness. However, by subtracting the mean vector from each term vector, any length bias may be removed from the system:

$$\lim_{n \to \infty} \frac{1}{n} \sum_{i=1}^{n} \vec{x}_i - \vec{x}_{mean} = \vec{0}$$

Figure 1A:
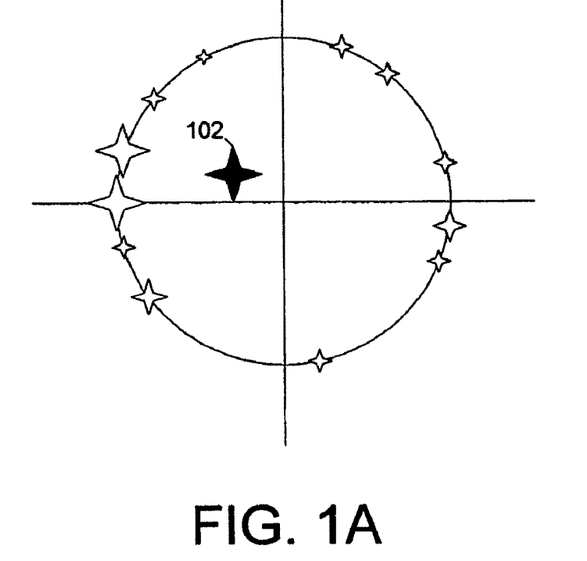
FIG. 1A depicts normalized term vectors and their frequencies for an exemplary corpus according to an embodiment.

In an embodiment, the vocabulary set of a Random Indexing model is represented by a vector with K dimensions, where K is equal to the number of entries in each index vector. In an embodiment, K is approximately 1,800. FIG. 1A depicts an embodiment in which K=2. As shown in FIG. 1A, the size of each cross represents the frequency of the term. All term vectors may be normalized and lie on a unit circle as a result. The mean 102 of all term vectors in the vocabulary may then be calculated. Since this mean vector 102 is not at the origin, the random document vector does not tend to approach the zero vector if its terms are unrelated.

Figure 1B:
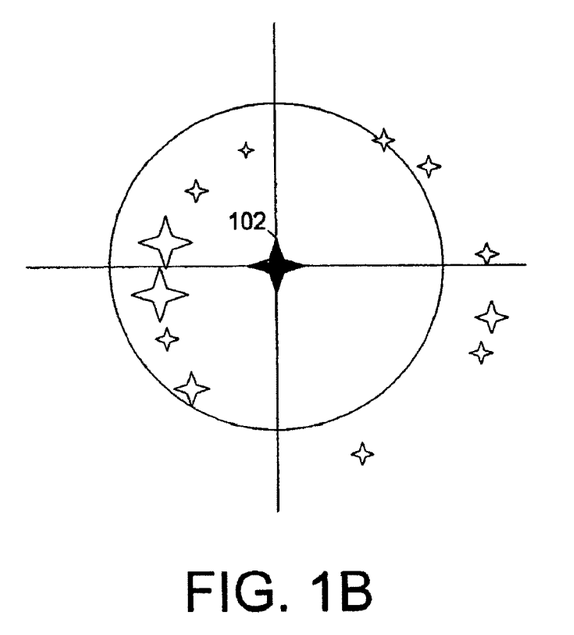
FIG. 1B depicts translated normalized term vectors and their frequencies for an exemplary corpus according to an embodiment.

FIG. 1B depicts the same set of term vectors as in FIG. 1A. However, the term vectors in FIG. 1B are translated such that the mean vector 102 lies on the origin. As such, the term vectors may no longer lie on the unit circle. The translation of the term vectors may resolve the length bias encountered before the re-calculated average of the text segment vector. Moreover, subtracting the mean vector 102 reduces the magnitude of those term vectors which are close in direction to the mean vector 102. In contrast, the magnitudes of term vectors that are most nearly opposite in direction from the mean vector 102 are increased. In other words, when a document vector is created as a sum of term vectors, terms having the most distinctive distributions may be given the most weight, while terms that are less selective about which other terms they co-occur with may be given relatively little weight. Accordingly, the benefits of inverse document frequency weighting (used in LSA) may be efficiently achieved.

Random Indexing may be used to construct a final model of text coherence comparable to the human evaluation of essay dimensions. Parameters may be provided to, for example, model Dimension 1, a discourse element's relatedness to the essay prompt, and Dimension 2, a discourse element's relatedness to other discourse elements. Instead of using a similarity cutoff to classify sentences with regard to their relatedness to other essay text segments, the present system may use a support vector machine (described below) using data generated from a Random Indexing method, such as the one described above.

In an embodiment, a classifier model trained on human-annotated data may be used to predict whether a sentence is related to another text segment. Comparing non-adjacent text segments to each other for similarity differs from prior art methods, which assume a linear relationship between consecutive sentences.

A support vector machine (SVM) is a classifying engine that may be applied to a variety of machine learning applications. SVMs may permit automatic feature combination by using similarity scores generated by a Random Indexing module as predictive features.

Figure 2:
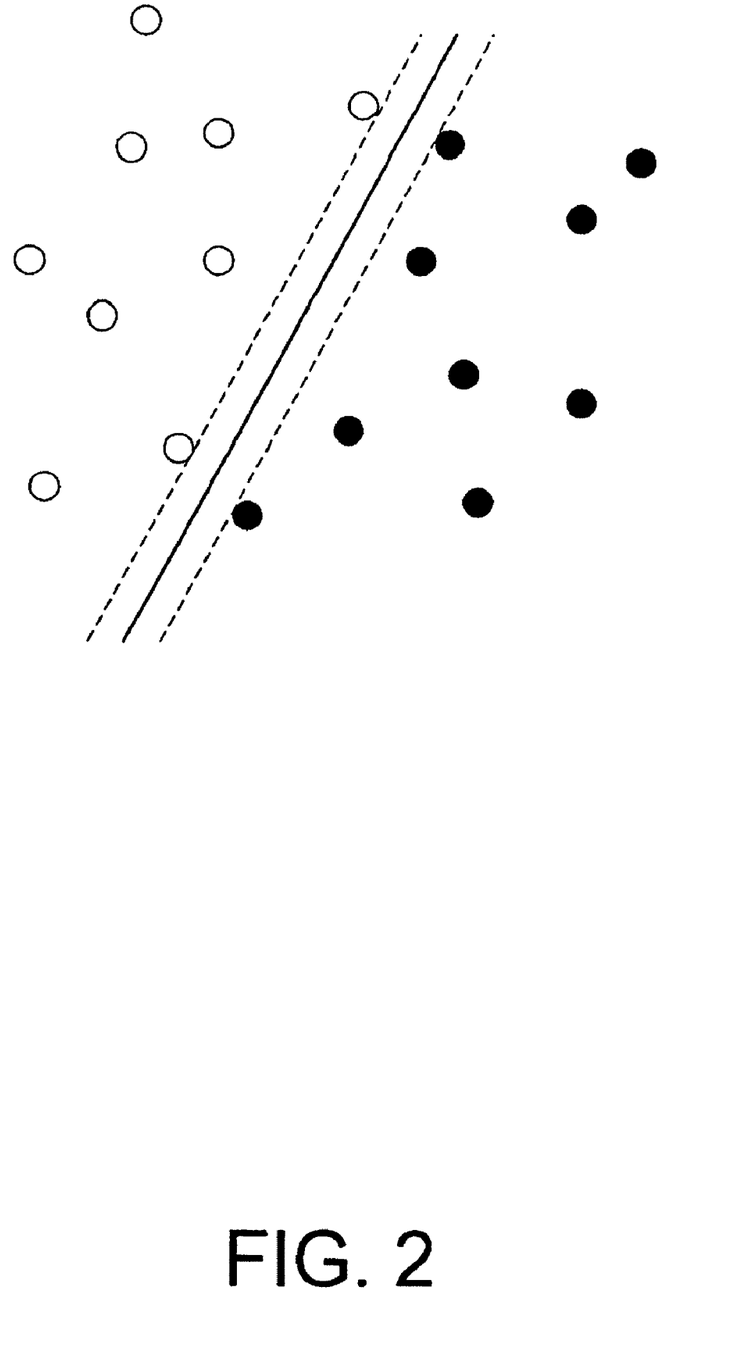
FIG. 2 depicts an exemplary linearly separating hyperplane having a largest margin of separation between data points for a corpus according to an embodiment.

Initially, a linear separator may be applied to the vector data. For n-dimensional data, the linear separator may find a vector w and scalar b such that $w \cdot x + b = 0$ is a hyperplane in $R^n$. For any vector x in class 0, $w \cdot x + b < 0$. Conversely, for any vector x in class 1, $w \cdot x + b \geqq 0$. In an embodiment, an algorithm for an SVM may further search for the linearly separating hyperplane which has the largest margin of separation between data points. The margin of a classifying hyperplane is the minimum Euclidean distance of any data point from the hyperplane. This is illustrated in FIG. 2 (where the margin of the separating line is indicated with parallel dashed lines).

Although many classification problems of interest are not linearly separable, SVMs may still be applied to such problems. The optimization equations for SVMs may be written in a dual form, in which the training vectors only occur as dot products $x_i \cdot x_j$ with one another. The hypothesis space of the SVM may be extended beyond linear functions by replacing these dot products with a nonlinear kernel function $K(x_i, x_j)$. In an embodiment, SVMs may be trained with radial basis functions as kernels. This kernel may permit the combination of multiple features in hypotheses.

The Random Indexing similarity scores based on the improved Random Indexing method may be the primary features used to predict the relatedness of different text segments. The vector representations for each word may be obtained by training on a large vocabulary, such as, for example, 30 million words of text. In an embodiment, the resulting set of, for example, 1800-entry vectors may be compressed to 300 entries by singular value decomposition. Finally, the mean vector may be subtracted from each word's index vector to correct for frequency bias when creating a document vector from its component word vectors.

In an embodiment, Dimension 1, the degree of relatedness to the essay prompt, may be relevant to four categories of sentences: Background, Conclusion, Main Idea, and Thesis. The Supporting Idea category of sentence may not be related to the prompt because it may express an elaboration of one of the main points of the essay and, thus, has a more tenuous connection to the essay prompt.

The essays may be annotated to identify the discourse sections, including "Background," "Conclusion," "Main Point," "Supporting Idea" and "Thesis." Next, the improved Random Indexing method may be performed to create text segment vectors. Rather than merely comparing one sentence to the next to determine linear coherence, the system may compare various text segments located throughout the text, in order to determine a global coherence. One or more of the following features may be provided to an SVM to enable it to predict whether a given sentence is related to the prompt:

1. The maximum similarity score of the target sentence with any sentence in the essay prompt.
2. The similarity score of the target sentence with the required task sentence (a designated portion of the prompt text which contains an explicit directive to the student to write about a specific topic).
3. The maximum similarity score of the target sentence with any sentence in the thesis of the essay.
4. The maximum similarity score of the target sentence with any sentence in the preceding discourse section.
5. The number of sentences in the current discourse section.
6. The number of sentences in the current discourse section with a similarity score with the prompt greater than a first threshold.
7. The number of sentences in the current discourse section with a similarity score with the required task sentence greater than a second threshold.
8. The number of sentences in the current discourse section with a similarity score with the essay thesis greater than a third threshold.
9. A Boolean feature indicating whether the target sentence contains a transition word, such as "however" or "although."
10. A Boolean feature indicating whether the target sentence contains an anaphoric element.
11. The category of the current discourse section. (This is encoded as five Boolean features: one bit for each of "Background," "Conclusion," "Main Point," "Supporting Idea" and "Thesis.")
12. The similarity score of the target sentence with predetermined text selections, such as other essay prompts.

The similarity scores may be computed using the Random Indexing method described above.

The calculation of features 1, 3 and 4 each depend upon the maximum similarity score of the sentence with any other sentence in the relevant discourse element, rather than the similarity score of the sentence with the entire text segment. This is because a sentence need only be connected to some part of a discourse element in order to be relevant to that element.

Features which measure the degree of similarity between the target sentence and the thesis may be provided to the SVM since only a relatively small amount of text is relevant. Comparing a single sentence to a prompt and the thesis may alleviate data sparsity issues. Additionally, the thesis statement may mediate the relevance of the target sentence to the prompt text. For example, the prompt may ask the student to take a position on a topic. The student may state this position in the thesis and provide an example to support it as one of her Main Ideas. As such, the example may be more clearly linked to the thesis than to the prompt. However, the example would still be related to the prompt in this case.

Considering the similarity scores of sentences in the current discourse section further alleviates data sparsity issues. However, such comparisons also allow a determination of whether the entire discourse element is relevant to the essay prompt.

Finally, feature 10 allows the system to handle cases in which a sentence contains very few content words, but is still linked to other material in the essay by means of anaphoric elements, such as "This is shown by my argument." In such a case, the sentence would normally be assigned a low similarity score with the prompt (and other parts of the essay). However, as a result of feature 10, the sentence may be classified correctly because it includes a pronoun.

To determine whether a sentence is related to the thesis, Dimension 2, four sentence categories may be considered: Background, Conclusion, Main Ideas, and Supporting Ideas. The features which are provided to the SVM for predicting whether or not a given sentence is related to the thesis (Dimension 2) are similar to those used for Dimension 1:

1. The maximum similarity score of the target sentence with any sentence in the essay prompt.
2. The similarity score of the target sentence with the required task sentence (a designated portion of the prompt text which contains an explicit directive to the student to write about a specific topic).
3. The maximum similarity score of the target sentence with any sentence in the thesis of the essay.
4. The maximum similarity score of the target sentence with any sentence in the preceding discourse section.

5. The number of sentences in the current discourse section.
6. The number of sentences in the current discourse section with a similarity score with the prompt greater than a first threshold.
7. The number of sentences in the current discourse section with a similarity score with the required task sentence greater than a second threshold.
8. The number of sentences in the current discourse section with a similarity score with the essay thesis greater than a third threshold.
9. A Boolean feature indicating whether the target sentence contains an anaphoric element.
10. The category of the current discourse section (encoded as Boolean features).
11. The sentence numbering position from the beginning of the current discourse section.

The similarity scores may be computed using the Random Indexing method described above.

For Dimension 2, feature 11 indicates how far into the current discourse section the target sentence is used. Because Supporting Idea text segments tend to be longer, this information is useful in accurate coherency evaluation. Sentences at the beginning of a Supporting Idea discourse section may not necessarily be treated similarly to those at the end.

Figure 3:
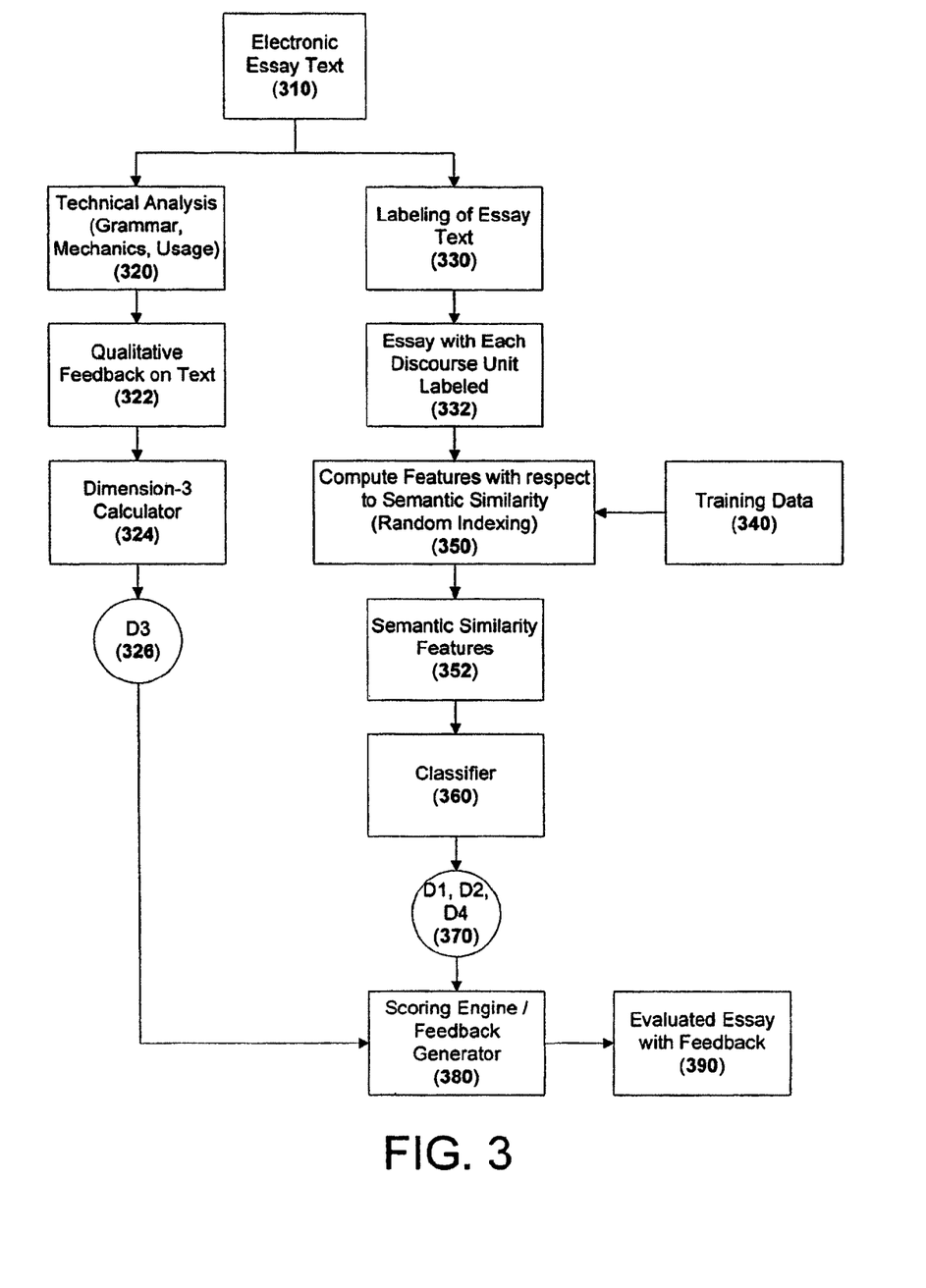
FIG. 3 depicts a functional diagram of an exemplary system for evaluating an essay according to an embodiment.

FIG. 3 depicts a functional diagram of an exemplary system for evaluating an essay according to an embodiment. FIG. 3 depicts four dimensions derived from the text to determine coherency. The electronic essay text 310 may be sent to a technical analysis tool 320 to extract qualitative feedback on the text 322. This technical analysis tool 320 may be, for example, Criterion™ available from Educational Testing Services or a similar tool that generates feedback 322 on grammar, usage and mechanics. This data may be sent to the Dimension 3 calculator 324, which uses the rules detailed above to assign a value to Dimension 3 326.

The Electronic essay text 310 may also be labeled 330 with discourse labels 332. Random indexing 350 may be performed on the labeled text with training data 340 in order to represent the text segments as vectors. The semantic similarity features 352 may be sent to the Support Vector Machine classifier 360 to generate the Dimensions for the essay text 370, which represent text coherency. The Dimensions may optionally be sent to a scoring engine or a feedback generator 380 and displayed to an essay writer 390.

Although the invention has been described with reference to the preferred embodiments, it will be apparent to one skilled in the art that variations and modifications are contemplated within the spirit and scope of the invention. The drawings and description of the preferred embodiments are made by way of example rather than to limit the scope of the invention, and it is intended to cover within the spirit and scope of the invention all such changes and modifications.

We claim:

1. A computer implemented method of determining a relatedness of two text segments within an essay, the method comprising:
   receiving an essay with a computer, wherein the essay comprises a plurality of text segments;
   determining, for two or more of the text segments, one or more words associated with each text segment;
   determining term vectors for each of the one or more words associated with each of the text segments, wherein the term vectors are adjusted by a mean vector derived from term vectors of all text segments;
   determining semantic vectors for words associated with the two or more text segments, wherein the semantic vectors are generated through training without a topically coherent corpus, wherein a semantic vector for a text segment is based on an average of term vectors of the words associated with the text segment;
   wherein, in the training, a label vector and a semantic vector are initially assigned to each word in the corpus;
   wherein for each word appearing within the corpus, an incremental vector is added to the semantic vector corresponding to the word, wherein the incremental vector is computed by multiplying each entry of the label vector corresponding to one or more second words proximate to the word by a weighted value;
   wherein each semantic vector is normalized to a unit length;
   summing the semantic vectors for words associated with the two or more text segments with the computer to determine a text segment vector for each text segment; and
   calculating a semantic similarity between at least one pair of text segment vectors with the computer to determine a relatedness of at least one pair of text segments corresponding to the text segment vectors.

2. The method of claim 1, wherein the weighted value is based on the proximity of the word to the second word.

3. The method of claim 1, wherein the label vector has about 1800 entries.

4. The method of claim 1, wherein the label vector has less than about ten entries that are non-zero.

5. The method of claim 1, wherein the semantic vector has about 1800 entries.

6. The method of claim 1, wherein the semantic vector has less than about ten entries that are non-zero.

7. The method of claim 1, wherein calculating a semantic similarity comprises computing a cosine of an angle between a pair of text segment vectors.

8. The method of claim 1, wherein elements of each label vector are initially set to either 1 or −1.

9. A computer-implemented method of determining the relatedness of two text segments within a text comprising:
   determining one or more words in each text segment with a computer;
   representing the one or more words of each text segment as term vectors;
   normalizing the term vectors;
   summing the normalized term vectors for all text segments;
   dividing the sum of the normalized term vectors by the number of term vectors to obtain a mean vector;
   subtracting the mean vector from each of the term vectors to generate recalculated term vectors;
   calculating the average of the recalculated term vectors for each text segment to obtain a text segment vector for each text segment; and
   calculating a semantic similarity between at least one pair of text segment vectors to determine the relatedness of at least one pair of text segments corresponding to the text segment vectors.

10. The method of claim 9, wherein calculating a semantic similarity comprises computing a cosine of an angle between a pair of text segment vectors.

11. A system for determining the relatedness of two text segments within an essay, the system comprising:
   a data processor; and
   computer-readable memory in communication with the data processor encoded with instructions for commanding the data processor to execute steps comprising:
      receiving an essay, wherein the essay comprises a plurality of text segments;

determining, for two or more text segments, one or more words associated with each text segment;

determining term vectors for each of the one or more words associated with each of the text segments, wherein the term vectors are adjusted by a mean vector derived from term vectors of all text segments;

determining semantic vectors for words associated with the two or more text segments, wherein the semantic vectors are generated through training without a topically coherent corpus, wherein a semantic vector for a text segment is based on an average of term vectors of the words associated with the text segment;

wherein, in the training, a label vector and a semantic vector are initially assigned to each word in the corpus;

wherein for each word appearing within the corpus, an incremental vector is added to the semantic vector corresponding to the word, wherein the incremental vector is computed by multiplying each entry of the label vector corresponding to one or more second words proximate to the word by a weighted value;

wherein each semantic vector is normalized to a unit length;

summing the semantic vectors for words associated with the two or more text segments to determine a text segment vector for each text segment; and calculating a semantic similarity between at least one pair of text segment vectors to determine the relatedness of at least one pair of text segments corresponding to the text segment vectors.

12. The system of claim 11, wherein the weighted value is based on the proximity of the word to the second word.

13. The system of claim 11, wherein the label vector has about 1800 entries.

14. The system of claim 11, wherein the label vector has less than about ten entries that are non-zero.

15. The system of claim 11, wherein the semantic vector has about 1800 entries.

16. The system of claim 11, wherein the semantic vector has less than about ten entries that are non-zero.

17. The system of claim 11, wherein calculating a semantic similarity comprises computing a cosine of an angle between a pair of text segment vectors.

18. The system of claim 11, wherein elements of each label vector are initially set to either 1 or −1.

19. A system for determining a relatedness of two text segments within a text, the system comprising:

a data processor; and computer-readable memory in communication with the data processor encoded with instructions for commanding the data processor to execute steps comprising:

determining one or more words in each text segment;

representing the one or more words of each text segment as term vectors;

normalizing the term vectors;

summing the normalized term vectors for all text segments;

dividing the sum of the normalized term vectors by the number of term vectors to obtain a mean vector;

subtracting the mean vector from each of the term vectors to generate recalculated term vectors;

calculating the average of the recalculated term vectors for each text segment to obtain a text segment vector for each text segment; and calculating a semantic similarity between at least one pair of text segment vectors to determine a relatedness of at least one pair of text segments corresponding to the text segment vectors.

20. The system of claim 19, wherein calculating a semantic similarity comprises computing a cosine of an angle between a pair of text segment vectors.

* * * * *